US012371301B2

(12) United States Patent
Barcellos Ramos et al.

(10) Patent No.: US 12,371,301 B2
(45) Date of Patent: Jul. 29, 2025

(54) DEVICE AND METHOD FOR DETECTING THE PRESENCE OF ABNORMALITIES IN A REEL

(71) Applicant: FITESA S.A., Porto Alegre (BR)

(72) Inventors: Alexandre Barcellos Ramos, Porto Alegre (BR); Rodrigo Nunes Da Silva, Porto Alegre (BR)

(73) Assignee: FITESA NÃOTECIDOS S.A., Porto Alegre (BR)

( * ) Notice: Subject to any disclaimer, the term of this patent is extended or adjusted under 35 U.S.C. 154(b) by 206 days.

(21) Appl. No.: 17/594,075

(22) PCT Filed: Apr. 2, 2020

(86) PCT No.: PCT/IB2020/053129
§ 371 (c)(1),
(2) Date: Oct. 1, 2021

(87) PCT Pub. No.: WO2020/202050
PCT Pub. Date: Oct. 8, 2020

(65) Prior Publication Data
US 2022/0185619 A1  Jun. 16, 2022

(30) Foreign Application Priority Data
Apr. 3, 2019 (EP) .................................. 19167111

(51) Int. Cl.
B65H 63/00  (2006.01)
G01N 21/88  (2006.01)
(Continued)

(52) U.S. Cl.
CPC ....... *B65H 63/006* (2013.01); *G01N 21/8851* (2013.01); *G01N 21/952* (2013.01);
(Continued)

(58) Field of Classification Search
CPC .............. B65H 63/006; B65H 2553/42; B65H 2701/31–319; G01N 21/8851;
(Continued)

(56) References Cited

U.S. PATENT DOCUMENTS 5,138,151 A * 8/1992 Inada ................... G01N 33/365
250/223 R
5,315,366 A * 5/1994 Inada ................... B65H 63/084
242/475.8

(Continued)

FOREIGN PATENT DOCUMENTS

CA  2884632 A1 *  3/2009  ........... G01B 11/026
EP  3109826 A2    12/2016
(Continued)

OTHER PUBLICATIONS

English translation of JP-2003213585-A, published Jul. 30, 2003. (Year: 2003).*
European Patent Office; International Search Report; entire document; May 20, 2020.

*Primary Examiner* — Christina A Riddle
(74) *Attorney, Agent, or Firm* — Price Heneveld LLP

(57) ABSTRACT

A device for detecting the presence of abnormalities in a reel includes an image capturing module for capturing images of the reel including at least one camera, a displacer for displacing the reel in a field of view of the at least one camera, an analyzer for analyzing the images captured by the at least one camera and detecting the presence of abnormalities. The image capturing module including an upper capturer and lower capturer, the upper capturer fixed on a movable support arranged for being movable with respect to lower capturer, the upper capturer and/or the lower capturer including at least one three dimension camera arranged for providing a three dimension image of the reel.

16 Claims, 10 Drawing Sheets

(51) Int. Cl.
*G01N 21/952* (2006.01)
*G01N 21/84* (2006.01)

(52) U.S. Cl.
CPC ...... *B65H 2553/42* (2013.01); *B65H 2701/31* (2013.01); *G01N 2021/845* (2013.01)

(58) Field of Classification Search
CPC ...... G01N 21/952; G01N 21/88; G01N 21/86; G01N 21/89; G01N 21/8901; G01N 21/8903; G01N 21/8914; G01N 21/8915; G01N 21/892; G01N 21/898; G01N 21/8983; G01N 2021/8854–8893; G01N 2021/8902; G01N 2021/8904; G01N 2021/8909–8912; G01N 2021/8924; G01N 2021/8925; G01N 2021/8927; G01N 2021/845–8455
USPC .......................................... 356/237.1–242.1
See application file for complete search history.

(56) References Cited

U.S. PATENT DOCUMENTS

| | | | | |
|---|---|---|---|---|
| 10,021,369 B2 * | 7/2018 | Peeters | ................ | G06T 7/0004 |
| 2019/0153672 A1 * | 5/2019 | Shitara | ............... | G01B 11/0691 |

FOREIGN PATENT DOCUMENTS

| | | | | | |
|---|---|---|---|---|---|
| JP | H07125925 A | | 5/1995 | | |
| JP | 2000337827 A | | 12/2000 | | |
| JP | 2003213585 A | * | 7/2003 | | |
| WO | WO-9208967 A1 | * | 5/1992 | ......... | G01N 21/8983 |
| WO | WO-0240383 A2 | * | 5/2002 | ........... | B65H 63/006 |
| WO | 2016058105 A1 | | 4/2016 | | |
| WO | 2016135664 A2 | | 9/2016 | | |

* cited by examiner

Table 1

| Anormality | Image | Tested Function | Invention | EP0934897 A1 | WO0240383A2 | JPH085581A |
|---|---|---|---|---|---|---|
| Contamination Strange Objects–Cardboard | 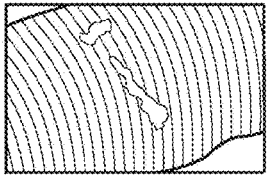 | Detects the Defect | ✓ | ✓ | ✓ | ✓ |
| | | Measures the Defect | ✓ | ✗ | ✗ | ✗ |
| | | Automatic Rejection of Defect | ✓ | ✗ | ✗ | ✗ |
| Telescope Effect | 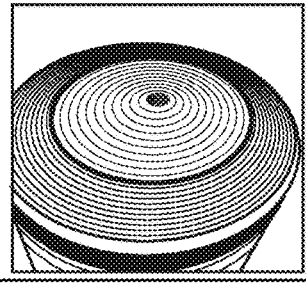 | Detects the Defect | ✓ | ✓ | ✓ | ✓ |
| | | Measures the Defect | ✓ | ✗ | ✗ | ✗ |
| | | Automatic Rejection of Defect | ✓ | ✗ | ✗ | ✗ |
| Core Misaligned | 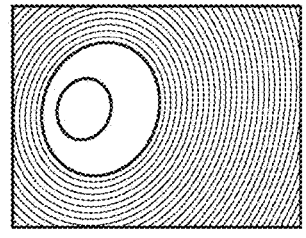 | Detects the Defect | ✓ | ✗ | ✗ | ✗ |
| | | Measures the Defect | ✓ | ✗ | ✗ | ✗ |
| | | Automatic Rejection of Defect | ✓ | ✗ | ✗ | ✗ |

FIG. 5

| Anormality | Image | Tested Function | Invention | EP0934897 A1 | WO0240383A2 | JPH085581A |
|---|---|---|---|---|---|---|
| Core Misaligned | | Measures the Defect | ✓ | ✗ | ✗ | ✗ |
| | | Automatic Rejection of Defect | ✓ | ✗ | ✗ | ✗ |
| | | Detects the Defect | ✓ | ✗ | ✗ | ✗ |
| Splice in a wrong way | | Measures the Defect | ✓ | ✗ | ✗ | ✗ |
| | | Automatic Rejection of Defect | ✓ | ✓ | ✗ | ✓ |
| | | Detects the Defect | ✓ | ✗ | ✗ | ✗ |
| Irregular Side | | Measures the Defect | ✓ | ✗ | ✗ | ✗ |
| | | Automatic Rejection of Defect | ✓ | ✓ | ✓ | ✓ |
| | | Detects the Defect | ✓ | ✗ | ✗ | ✗ |

Table 1

FIG. 6

Table 1

| Anormality | Image | Tested Function | Invention | EP0934897 A1 | WO0240383A2 | JPH085581A |
|---|---|---|---|---|---|---|
| Irregular Side | | Automatic Rejection of Defect | ✓ | ✗ | ✗ | ✗ |
| | | Detects the Defect | ✓ | ✓ | ✓ | ✓ |
| | | Measures the Defect | ✓ | ✗ | ✗ | ✗ |
| Wrinkled Reel | | Detects the Defect | ✓ | ✓ | ✓ | ✓ |
| | | Measures the Defect | ✓ | ✗ | ✗ | ✗ |
| | | Automatic Rejection of Defect | ✓ | ✗ | ✗ | ✗ |
| Width Less than specified | | Detects the Defect | ✓ | ✗ | ✗ | ✗ |
| | | Measures the Defect | ✓ | ✗ | ✗ | ✗ |
| | | Automatic Rejection of Defect | ✓ | ✗ | ✗ | ✗ |

FIG. 7

| Anormality | Image | Tested Function | Invention | EP0934897 A1 | WO0240383A2 | JPH085581A |
|---|---|---|---|---|---|---|
| Width Greater than specified | | Detects the Defect | ✓ | ✗ | ✗ | ✗ |
| | | Measures the Defect | ✓ | ✗ | ✗ | ✗ |
| | | Automatic Rejection of Defect | ✓ | ✗ | ✗ | ✗ |
| Variation of width in the same Reel | | Detects the Defect | ✓ | ✓ | ✓ | ✓ |
| | | Measures the Defect | ✓ | ✗ | ✗ | ✗ |
| | | Automatic Rejection of Defect | ✓ | ✗ | ✗ | ✗ |
| Blurred Reels | | Detects the Defect | ✓ | ✗ | ✗ | ✗ |
| | | Measures the Defect | ✓ | ✗ | ✗ | ✗ |
| | | Automatic Rejection of Defect | ✓ | ✗ | ✗ | ✗ |

Table 1

FIG. 8

| Anormality | Image | Tested Function | Invention | EP0934897 A1 | WO0240383A2 | JPH085581A |
|---|---|---|---|---|---|---|
| Tears / Breaking | | Detects the Defect | ✓ | ✓ | ✓ | ✓ |
| | | Measures the Defect | ✓ | ✗ | ✗ | ✗ |
| | | Automatic Rejection of Defect | ✓ | ✗ | ✗ | ✗ |

Table 1

Table 2

| Item | Defect | Rule | Drawing |
|---|---|---|---|
| 1 | Misaligned core Or Core dimension | Core offset from average reel's face plane should be less than 3mm. If the offset repeats on both ends, defect will be counted as misalignment. If not, will be counted as bad core dimension. | 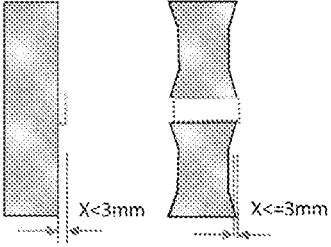 |
| 2 | Crushed Core | Core interior should not have overhanging paper material with size greater than 10mm, measured radially. NOTE 1: Core condition will be visible at a maximum 30mm depth. Any damage beyond this depth will not be visible. NOTE 2: Detection of various loose materials within the reel is not covered by this item. | 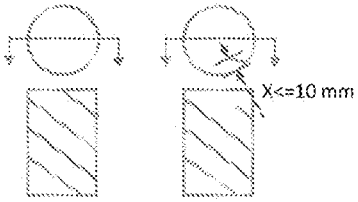 |
| 3 | Wrong width | Average width will be measured and checked within +/- 3mm of nominal dimension. |  |
| 4 | Wrong diameter | Diameter measured transversely to movement direction should be checked within +/- 3 mm of the nominal dimension. | 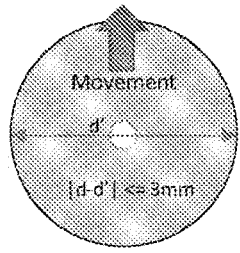 |
| 5 | Irregular Side - Steps | Steps deeper or higher than 3mm and at least 5mm wide should be considered a defect. | 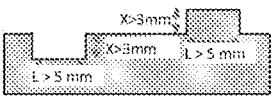 |

FIG. 10

Table 2

| 6 | Irregular Side – Coning | Difference from outer and inner width should be less than 3mm. | 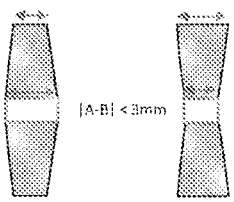 |
|---|---|---|---|
| 7 | Irregular Side – Telescope Effect | Outer and inner width are OK (less than 3mm), but have height offset larger than 3mm. | 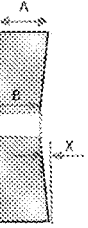 |
| 8 | Irregular Side – Nail Head | Center width should have less than 3mm difference from outer and inner width. |  |
| 9 | Irregular Side - Waving | Sine waves with period (P) larger than 10mm and amplitude (A) larger than 5mm should be rejected. | 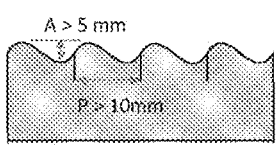 |

FIG. 11

DEVICE AND METHOD FOR DETECTING THE PRESENCE OF ABNORMALITIES IN A REEL

BACKGROUND

The present invention relates to a device for detecting the presence of abnormalities in a reel. The invention also concerns methods using said device.

Various material, such as woven or nonwoven fabrics, metal or yarn are advantageously packed and provided to manufacturers in reel(s) (also named roll or bobbin depending on the material) to optimize the delivery in terms of quantity and easy to carry package. The raw material undergoes generally a process of cutting, winding and packaging in order to be ready for delivery to the consumer without defects.

Failures in the product that will be wound on the reel are checked by inspecting flat surface during the production process. Before the product enters the winder it goes through an inspection usually carried out in a two-dimensional plane to verify failures such as, holes, dirt, insects, filaments distribution, among others.

Nowadays, in the manufacture of products where the final products are reels, the verification of failures and contaminations after cutting these reels is carried out by visual observation only and usually by sampling.

During cutting and winding process, several abnormalities such as failures and contaminations can occur. Failures that occur in this stage are related to poor winding, contamination and/or cutting defect, which can lead to core misplacement. When rolled up, the product itself may fold or crease at some point of this winding, which, at the end of the process, would result in a poor quality reel. The consumer would receive a defective reel, which would lead to its misuse and sometimes return of that product because it cannot be used by the customer.

Various approaches for detecting failures or contaminations have been reported to prevent the delivery of non-compliant reels of various material.

The document WO2014160180 A1 (ALCOA INC [US]) describes a system for inspecting the roll surface comprising a prims, a camera and a light source. The light source and the prism are set up so as to provide light to the surface of the roll at an angle of 75 degrees. During the rotation of the roll, the camera is still and scans the roll to provide a plurality of lines, each line corresponding to a section of the roll. Then, the system comprises a computer-based program capable of creating at least one frame by combining the received lines, the frame being a two dimensions image. The disclosed method and system are limited to hot or cold metal.

Alternatively, the document EP0934897 A1 (COGNIVISION RESEARCH SL [ES]) discloses an apparatus for inspecting spinning bobbins of yarn. In this document, the apparatus comprises two 2D cameras that are displaced with respect to the bobbin in a direction parallel to the bobbin's longitudinal axis by suitable driving means. Each camera shoots a plurality of images from various areas of the bobbin under particular lighting conditions. The various images are later on processed by a computer program to evaluate defects of the yarn bobbin.

The document WO0240383 A2 (LINETECH IND INC [US]) describes a filament inspection method for detecting abnormalities in a wound yarn package. The disclosed method includes illuminating the yarn package while sensing and recording a 2D image of the illuminated yarn package. The method further includes evaluating the recorded image in accordance with predetermined criteria to determine whether the recorded image indicates the presence of any abnormalities in the yarn package.

The document JPH085581 A (KANEBO LTD) describes a contamination detector for a bobbin wherein a gray level image input means (CCD camera), i.e. 2D camera, picks up the image of a thread winding bobbin. The image is subjected to A/D conversion before being transferred to a processing section for detecting contamination.

However, when it comes to detecting abnormalities such as failures and contaminations, in particular of nonwoven fabrics, the existing prior art does not provide satisfying solutions notably because it fails to detect and measure certain failures or contaminations, for instance misaligned core, splice in a wrong way, irregular side, variation of the width or blurred reels. Failures that occur at this stage result in a poor quality reel, which leads to its misuse and sometimes return of that product because it cannot be used by the customer. Overall, abnormalities lead to an overall increase of the cost for the manufacturer because a reel with abnormalities cannot be sold as such to a client or customer.

Therefore, the type of failures or contaminations detectable by the existing prior art is limited to a portion of the possible failures or contaminations that are likely to occur when manufacturing reels. There is a need for a device and method with a broader scope for abnormalities detection.

SUMMARY

One of the object of the invention is to provide a device and a method free from, or at least minimizing, the limitations of the known devices and methods.

Another object of the invention is to provide information on abnormalities that may be encountered in reels, in particular on the external surface of said reel, for instance measurement of said abnormality.

Yet another object of the invention is to provide a device and a method capable of generating accurate images and providing valuable and reliable information on abnormalities to the user to approve or not the quality of the reel.

Still another object of the invention is to provide a device and a method to determine abnormalities, such as failures and contaminations, that could have occurred during the winding and cutting of the reels, preventing the consumer or user of these reels from receiving the product with failures and/or contaminations.

Other objects and advantages of the invention will become apparent to those skilled in the art from a review of the ensuing detailed description, which proceeds with reference to the following illustrative drawings, and the attendant claims.

According to the invention, at least part of these objects are achieved by means of a device for detecting the presence of abnormalities in a reel, in particular on the external surface of the reel, the device comprising:
  an image capturing module for capturing images of the reel, said image capturing module comprising at least one camera,
  displacing means for displacing said reel in the field of view of said at least one camera,
  analyzing means for analyzing the images captured by said at least one camera and detecting the presence of abnormalities, wherein the image capture module comprises upper capture means for capturing image of the upper face of the reel, and lower capture means for capturing image of the lower face of the reel, the upper capture means being fixed on a movable support arranged for being movable with respect to lower capture means, the upper capture means and/or the lower capture means comprising at least one three dimensions (3D) camera arranged for providing a three dimensions (3D) image of the reel.

The present invention comprises an image capture module organized in upper capture means and lower capture means. In other words, when a reel is inspected by the claimed device, the reel, operated by displacing means, is displaced between the upper capture means and the lower capture means. Thus, the reel is inspected on its upper face by the upper capture means and on the lower face by the lower capture means, thereby providing images from both upper and lower faces of the reel.

Advantageously, the upper image capture means comprises at least one 3D camera for providing 3D images of the reel operated by the displacing means. The 3D images are processed by analyzing means for detecting the presence of abnormalities. The presence of 3D camera is very advantageous since it provides more accurate images of the reel, thereby facilitating the detection of abnormalities.

In the present invention, the 3D camera of the upper capture means is fixed on a moveable support arranged for being moveable with respect to the lower capture means. The movable support allows adjusting the position of the upper capture means with respect to the reel, for instance depending on the height of said reel. Therefore, the camera(s) fixed on the moveable support will be kept always above the upper face of the reel.

When a plurality of cameras are fixed on the movable support, the cameras are stationary relative to one another. The motion of the moveable support allows moving all the camera simultaneously In the prior art, the cameras move and this movement is done in order to scan all the reel. In the present invention, the support moves, the cameras are fixed in the support, and this movement is for adjusting the accuracy of the image that the camera be capture. This adjust is very important in view of the size of the reel. This movement ensures that the capture means can capture images that any size of reel. The system adjusts the cameras by moving the moveable support according to the reel height for instance.

According to the present invention, the images from the camera(s) of the moveable support are all generated from the same point with respect to the reel which improves the accuracy of the captured images. It also allows one by one comparison between the captured images from the cameras of the moveable support. Overall, it increases the reliability of the captured images.

In one embodiment, the distance between the moveable support and the reel is adjusted automatically depending on the known parameters of the reel to be inspected, for instance the width of said reel. The device of the invention can adjust itself automatically for all kinds of reels.

The moveable support is also advantageous for tuning the focus of the 3D camera on the reel, in particular on the upper face of said reel. The analyzing means is capable of calculating the best position for the moveable support in order to obtain for example the best focus configuration for the cameras of said moveable support.

The lower capture means are either stationary or mobile with respect to the upper capture means. In a particular embodiment, the lower capture means are preferably stationary.

In one embodiment, the upper capture means comprise at least one 3D camera and at least one 2D camera. All the cameras are fixed on the moveable support which helps providing a constant gap between the cameras and the reel.

According to an embodiment of the invention, the image capturing module further comprises illuminating means for illuminating the reel during the image's capturing. Advantageously, the illuminating means are coupled to the moveable support so that the camera(s) of the moveable support and the illuminating means are moveable simultaneously. In a preferred embodiment, the upper capture means and the lower capture means each comprises illuminating means. For instance, the illuminating means comprises a set of LED. Preferably, the illuminating means comprises at least a set of LED. In an embodiment, the illuminating means comprises 5 (five) set of LED coupled to the upper capture means, and 5 set of LED coupled to the lower capture means. Preferably, the device comprises one LED per camera.

According to another embodiment, the device further comprises at least one actuator for actuating the displacement of the movable support. When all the cameras of the upper capture means are fixed on a single movable support, the actuator is capable of actuating simultaneously the motion of all the cameras.

Preferably, the device further comprises one or more guide for guiding the motion of the moveable support.

In an embodiment, the upper capture means comprises at least one 3D camera and at least one 2D camera, and/or the lower capture means comprises at least one 3D camera and at least one 2D camera. Advantageously, the 3D camera captures dimensions and the 2D camera captures contaminations, combining both, we have measurements of reels and evaluation of contaminations.

For example, the 3D camera comprises a laser emitter coupled to an image acquisition camera. The laser emitter emits for instance in line format. The acquisition camera operates preferably through the principle of sturdy light. The camera visualizes the deformation of the laser when focusing on the reel, and through this image, while the reel is in motion, it is possible to generate a three dimensional map of the surface of the reel that is subsequently processed by the analyzing means. With this equipment, it is possible to analyze dimensional characteristics of the reel, as well as defects related to the surface of the reels such as corrugations, steps, etc.

For instance, the 2D camera is an equipment for image acquisition in line format, preferably with 4096 pixels, preferably at least 4096 pixels (minimum). The image is formed by passing the reel under the camera, the line-by-line acquisition being made to provide an image comprising the complete product. The image is subsequently processed by the analyzing means.

Advantageously, the camera(s) of the device are coupled to an encoder to ensure each camera is capturing the same size of images. Advantageously, the encoder is coupled to the displacing means, for instance the conveyor belt with rollers, to receive exactly the speed of reel with respect to the camera(s). This allows the synchronization of the camera(s).

According to another embodiment, the device comprises at least a sensor module for activating and deactivating the image capture module to control the image's capture depending on the position of the reel with respect to the camera(s). For instance, the sensor can be coupled to the displacing means so as to automatically switch on or off the image capture means depending on the position of the reel.

In other words, the sensor module allows to synchronize the capture means and the illuminating means with the position of the reel.

Advantageously, the sensor comprises a safety sensor, for instance a safety barrier. The safety sensor is coupled to the displacing means and is capable of stopping the displacement of the reel by the displacing means, for instance in case of collision between the reel and the moveable support. Advantageously, the sensor helps to avoid crashes between the reel and the movable support. If the displacing means is a conveyor belt with rollers, the safety module, for instance a safety barrier, can turn off the rotation of the roller in case of collision between the reel and the moveable support.

In an embodiment of the invention, the displacing means comprises at least a conveyor belt for conveying the guiding of the reel through the field of view of said at least one camera.

According to an embodiment, conveyor belt comprises a plurality of rollers, said rollers having a beveled surface arranged for contacting the reel. In order to guarantee the accuracy of the reading both on the upper and lower faces, the rollers of the conveyor belt have been preferably redesigned so as to have a beveled surface. Advantageously, the beveled surface allows to avoid any contact between the core of the reel and the roller if we have an off set on it. When the core touches the roller, it can impact of images capturing.

In yet another embodiment, the device comprises cleaning system for cleaning the camera, in particular the lens of the camera(s), for example a pneumatic system with blow nozzles and regulating valves for regulating the air flow on the lens of the camera(s). Preferably, the upper capture means and the lower capture means are each coupled with a cleaning module. For example, the cleaning system comprises a pneumatic system with blow nozzles, in order to clean the lenses of the camera(s). Each blow nozzle is coupled to a flow regulating valve, in order to decrease or increase the intensity of the air puff. For instance, the cleaning system has one blow nozzles for each camera, This is for the purpose of dividing the air flow and maximizing the efficiency of the system.

Preferably, the device of the invention comprises analyzing means for processing or analyzing the captured images and detecting the abnormalities. Preferably, the analyzing means comprises a software or a computer implemented program. The analyzing means receive the captured images.

The analyzing means process the capture image to provide at least one 3D image based on the capture images from the at least 3D camera called the processed image. When the device of the invention comprises at least one 2D camera and at least one 3D camera, the analyzing means provides at least one 3D image and one 2D image from the upper face and/or the lower face depending on the position of the cameras. Subsequently, the analyzing means analyze the processed image to detect one or more abnormalities. For instance, the analyzing means comprises computation means for computing a parameter of a detected abnormality.

According to an embodiment, the device further comprises computation means for computing at least one parameter of the detected abnormality, such as measuring at least one dimension of said abnormality, such as the width, the diameter or the height or the volume.

In an embodiment, the analyzing means compare a computed parameter with a reference parameter known of the reel to detect an abnormality of the reel. For instance, based on the processed image provided by the 3D image from the 3D camera, the analyzing means calculate a dimension of the reel, for instance the diameter, and compare it to the reference value to determine whether the calculated diameter matches the reference value. If the calculated parameter does not match the reference value, it means there is an abnormality.

In another embodiment, the analyzing means are arranged for stopping the displacing means and issuing an audible warning and/or sending a warning message to the user if one or more abnormalities are found, preferably the warning are settable, for instance on software.

According to a preferred embodiment, the abnormalities are chosen among misaligned core, core dimensions default, crushed core, width variation, diameter variation, irregular side such as coning, telescope effect, nail head or waving, or strange objects or color contamination, and foreign body.

According to the invention, at least part of the objects mentioned above are achieved by means of a method for detecting one or more abnormalities in a reel, in particular on the external surface of the reel, the method comprising—
  i) providing a device according to the invention as described above;
  ii) activating the displacing means so as to place the reel between the Upper capturing means and the lower capturing means;
  iii) actuating the movable support so as to place the reel in the field of view of the 3D camera;
  iv) capturing images of the reel;
  v) analyzing the captured images to detect the presence of abnormalities;

The particular advantages of the method are similar to the ones of the device of the present invention and therefore do not need to be repeated here.

In an embodiment, the method further comprises the step of:
  Providing the theoretical value of at least one parameter of the reel, for instance the width in cross section of the diameter;
  Moving the movable support depending on said theoretical value of the reel to adjust the position of the reel with respect to the 3D camera;

The theoretical value can be calculated by the software, or provided to the device by the user.
The theoretical value is for instance a reel specification or dimension required for by the customer.
The analyzing means preferably control the motion, i.e. the positioning, of the moveable support.

According to an embodiment, the image capturing module comprises at least one 3D camera and at least one 2D camera, the method further comprises:
  Computing the captured 3D and the 2D images to generate a processed image;
  Analyzing the processed image to detect the presence of abnormalities;

In another embodiment, the method further comprises computation means for computing a parameter of the detected abnormality by measuring at least one dimension of said abnormalities such as the width or the height or the volume diameter, visual defects such as misaligned core, core dimensions default, crushed core, irregular side such as coning, telescope effect, nail head or waving or strange objects or color contamination.

Preferably, the computation means compare the measured dimension with a standard measure, in other word a reference measure to detect any abnormality. The reference measure is the measure of the dimension without abnormality.

As defined above, the term abnormality as used herein defines defects, in other words failures, that can occur in reel, for instance a poorly wound reels, reel with decentralized core or with a varied volume along the diameter of the reel. Abnormality also defines contaminations, in other words objects or elements that can end up caught in the reel, for instance hair strands, dust, insects. Abnormalities in reel decrease the quality of the product.

The present invention aims at detecting abnormalities in the reel, for instance on the external surface of the reel. The external surface of the reel can be defined as the surface of reel that is visible to the user. The reel is a cylindrical element that comprises the two opposite main faces delimited by a circular lateral face. The external surface of the reel comprises the surface of said two main faces and the surface of said circular lateral face.

The present invention can be applied to all materials suitable for being packed in reel, such as paper, fabric (either woven or nonwoven), metal, etc. In a preferred embodiment, the claimed invention is used for reels comprising nonwoven fabric.

The embodiments described for the device also apply mutatis mutandis to the method according to the present invention. Similarly, the embodiments described for the method also apply to the device according to the present invention mutatis mutandis.

BRIEF DESCRIPTION OF THE DRAWINGS

Further particular advantages and features of the invention will become more apparent from the following non-limitative description of at least one embodiment of the invention which will refer to the accompanying figures, wherein

FIGS. 5-9 show Table 1 which represents comparative results between the invention and the existing prior art to detect some abnormalities; and FIGS. 10 and 11 show Table 2 which illustrates some abnormalities that could be detected with the present invention.

DETAILED DESCRIPTION OF THE PREFERRED EMBODIMENTS

The present detailed description is intended to illustrate the invention in a nonlimitative manner since any feature of an embodiment may be combined with any other feature of a different embodiment in an advantageous manner.

Figure 2A:
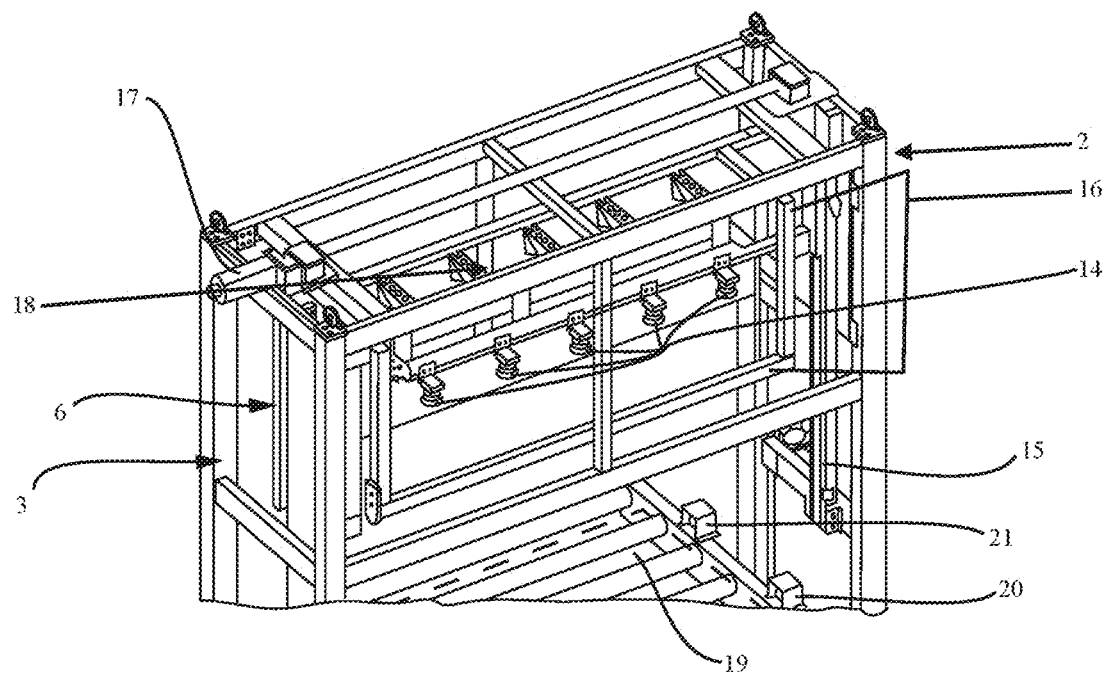
FIG. 2A shows a perspective view of the upper part of the device of FIG. 1.
Figure 2B:
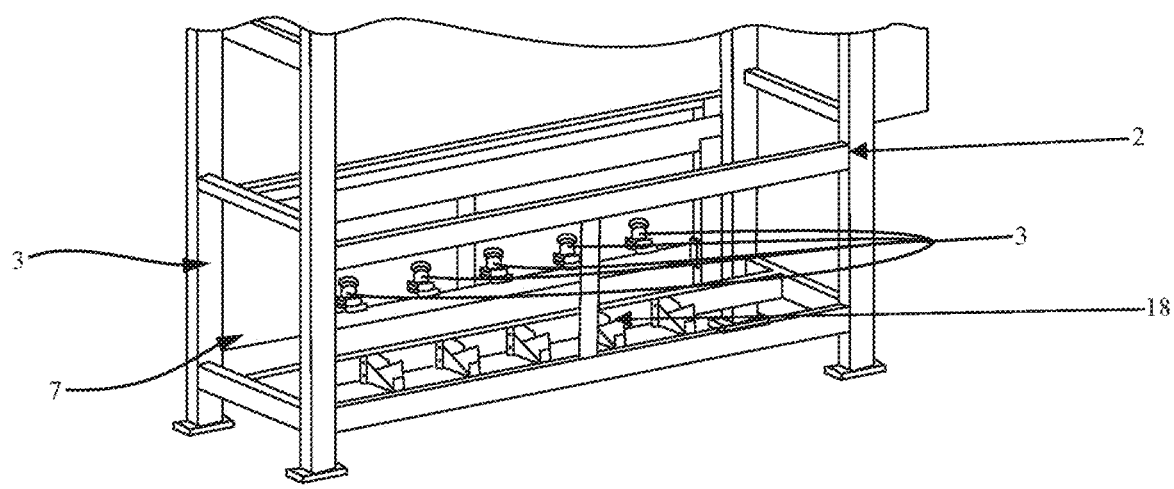
FIG. 2B shows a perspective view of the lower part of the device of FIG. 1.
Figure 3:
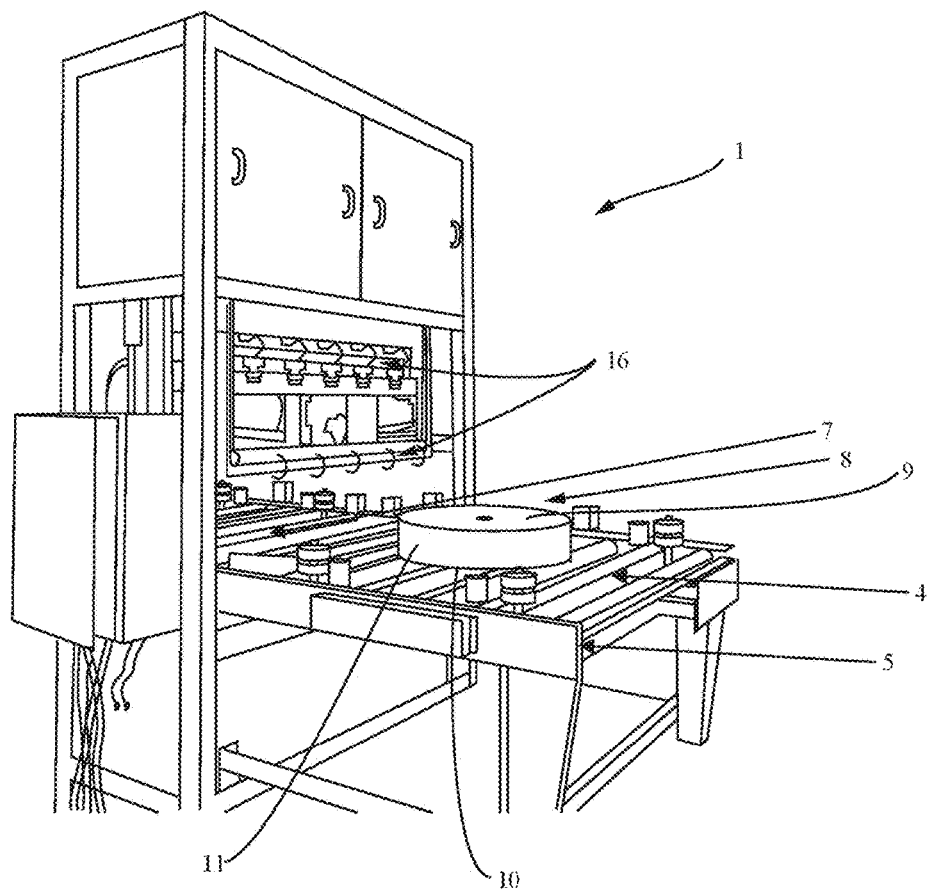
FIG. 3 shows an overview of the device of FIG. 1 operating a reel.
Figure 4:
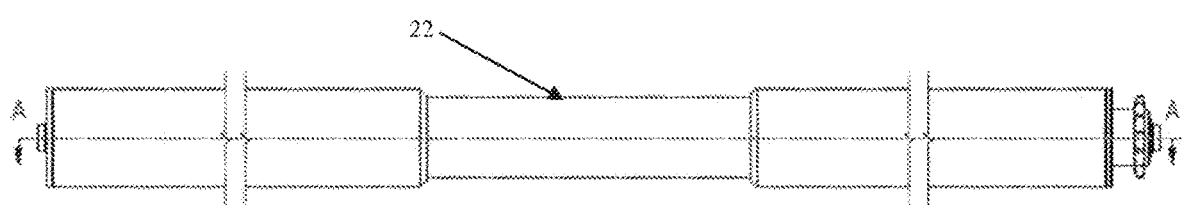
FIG. 4 shows the beveled surface of the roller of the conveyor belt of the device shows in FIG. 3.
Figure 9:
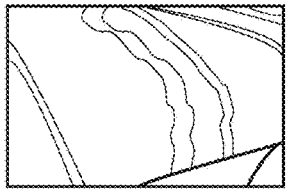

FIGS. 1-4 represent a device 1 according to an embodiment of the invention. The device 1 comprises a frame 2 hosting an image capturing module 3, and displacing means 4 represented here as a conveyor belt 5 with beveled shapes rollers 22 as shown in FIG. 4. In the disclosed embodiment, the device was used in a nonwoven factory where after cutting of said reels, these are individually taken and transported, one by one, to the conveyor belt of the device for abnormalities detection.

The image capturing module 3 comprises upper capture means 6 and lower capture means 7, as shown in FIGS. 2A and 2B.

When the device 1 operates a reel 8 to be inspected, as shown in FIG. 3, the reel 8 is placed on the conveyor 5 that displaces the reel 8 toward the image capturing module 3, in other words between the upper capture means 6 and the lower capture means 7. The upper capturing means 6 capture image of the upper face 9 of the reel 8. The lower capturing means 7 capture image of the lower face 10 of the reel 8. The upper capturing means 6 and the lower capturing means 7 are also capable of capturing images from the circular lateral face 11 of the reel 8, in addition to the upper 9 and lower 10 faces of the reel 8.

Figure 1:
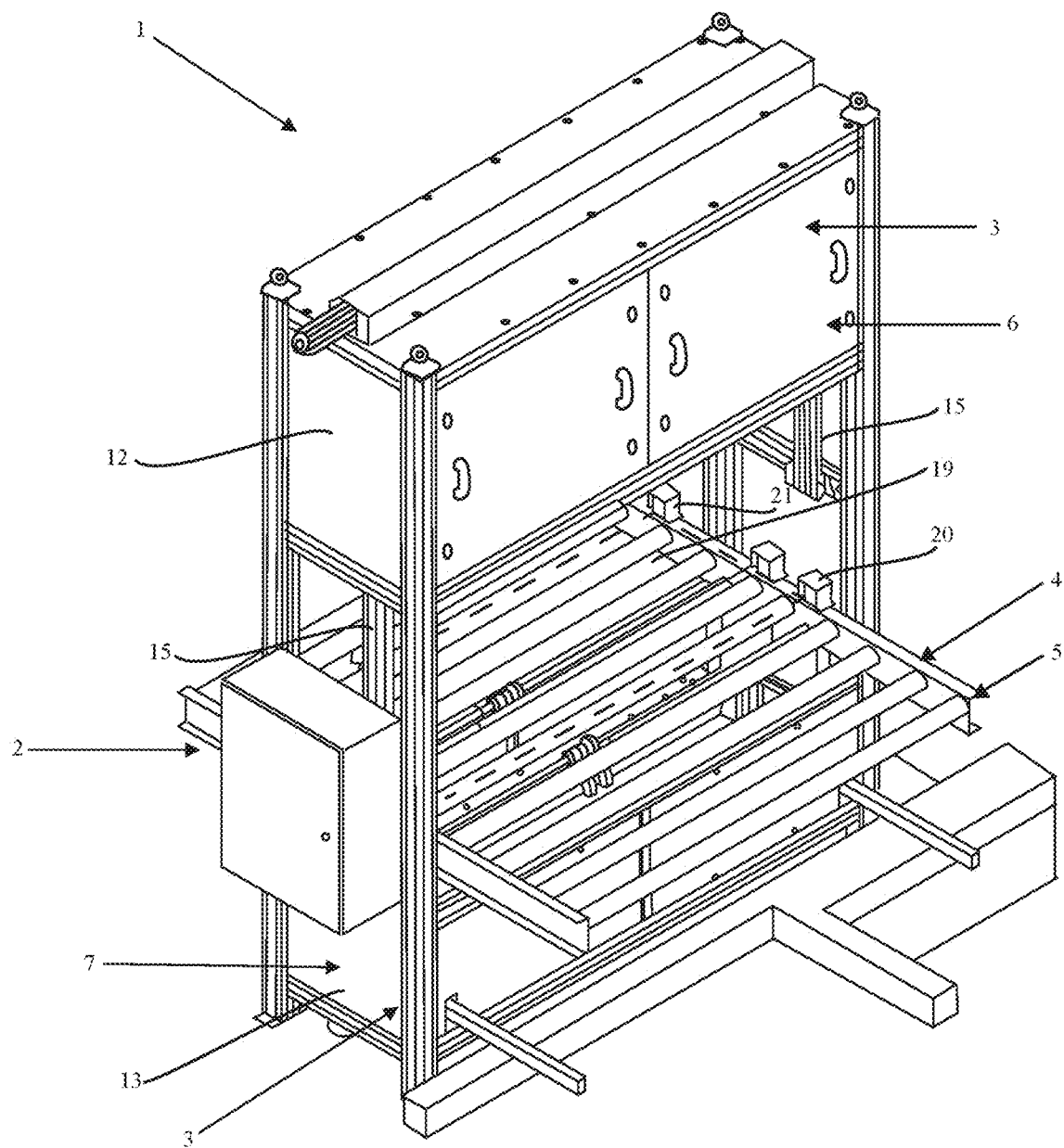
FIG. 1 shows an overview of the device according to a first embodiment.

In the illustrated embodiment in FIGS. 1-3, the upper capture means 6 and lower capturing means 7 are respectively received in an upper housing 12 and a lower housing 13.

In the present invention, the image capture module 3 comprises at least one camera 14. In this embodiment, the image capturing module 3 comprises both 2D cameras and 3D cameras. The upper capture means 6 comprises five 2D cameras and five 3D cameras, whereas the lower capture means 7 comprises five 2D cameras and five 3D cameras.

The upper housing 12 further comprises linear guides 15 for guiding the displacement of a movable support 16 with respect to the lower capture means and with respect to the reel 6 displaced by the displacing means, in the present case the reel being placed on the conveyor belt 5.

The cameras 14 of the upper capture means 6 are fixed on the moveable support 16. The camera 14 fixed on the movable support 16 are oriented toward the reel 8 placed on the conveyor 5. When the movable support 16 is sliding in the linear guides 15, the distance between the upper face of the reel 8 and the cameras 14 fixed on the movable support 16 varies.

The translation motion of the movable support 16 is actuated by an actuator 17, for instance a servo motor received in the upper housing 12.

According to the present embodiment, the device 1 further comprises illumination means 18 for illuminating the reel 8 during image captures. The upper capturing means 6 and the lower capturing means 7 are each coupled to a series of LED.

In the disclosed embodiment, the position of the moveable support 16 is adjusted according to the width of the reel 8. The conveyor belt 5 carries the reel 8 between the upper capture means 6 and the lower capture means 7 to an area named inspection area 19. In the present invention, the inspection area corresponds to the field of view of the camera 14. Upon arrival in the inspection area 19, the reel 8 activates a first sensor 20. This first sensor 20 switches on the illumination means 18 and controls the 2D cameras 14 and 3D cameras 14 of the image capture module 3.

Therefore, the cameras 14 begin recording the images. Upon leaving the inspection area 19, the reel 8 deactivates a second sensor 21, which switches off the illumination means 18 and commands the cameras 14 to finalize image capturing. The captured images are transmitted to the analyzing means, in the present case a software. The software processes (also called "sews") the captured images of the cameras 14 to form at least four images, two 2D images (upper and lower surface) and two 3D images (upper and lower surface). The software saves the images and tracks these images for abnormalities.

Preferably, the software is designed for detecting the following abnormalities: misalignments of both the core and the material, when wound, crushing of the reel, incorrect width along the spool, disproportional diameter, irregular sides, telescopic effect in the winding, undulation when winding, defects such as for example the center of the reel having a smaller diameter than the ends and still contaminations by hair strands among others.

Depending on the presence or the absence of abnormalities in the reel, the software:
 (i) stops the conveyor belt until the operator checks the reel,
 (ii) points out segregation of the reel as warning message in a report,
 (iii) issues an audible warning.
 (iv) robot moves the bad reel to the scrap position.

As shown in FIGS. 5-9, Table 1, applicants have performed comparative studies to compare the results of the present invention versus the existing technics for the detection of a given abnormality.

Overall, the claimed solution is the only one allowing the detection, measuring and automatic rejection of all the tested abnormalities.

For instance, contrary to the existing prior art, the claimed invention is capable of detecting and measuring the following abnormalities:
 Contamination strange, object cardboard;
 Telescope effect
 Core misaligned
 Splice in a wrong way
 Irregular side
 Wrinkled reel
 Width less than specified
 With greater than specified
 Variation of width in the same reel
 Blurred reels
 Tears/breaking
 Color FIGS. 10 and 11, Table 2 illustrates the rules applied by the present invention, in an embodiment, to detect some abnormalities. For instance, the reel is considered to have irregular side/coning if the difference between the outer and the inner width is greater than 3 mm. If the analyzing means detect a difference greater than 3 mm for instance, it means the reel 8 has an abnormality, Advantageously, in the present invention, there is no a fixed difference, it is settable on the software by the user according customers' requirements for instance.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This is for example particularly the case regarding the different apparatuses which can be used.

REFERENCE NUMBERS

1 Device according to a first embodiment
2 Frame
3 Image capturing module
4 Displacing means
5 Conveyor belt
6 Upper capture means
7 Lower capture means
8 Reel
9 Upper face of the reel
10 Lower face of the reel
11 Circular lateral face of the reel
12 Upper housing
13 Lower housing
14 Camera
15 Linear guide
16 Moveable support
17 Actuator of the movable support
18 Illumination means
19 Inspection area
20 First sensor
21 Second sensor
22 Beveled shaped roller of the conveyor belt

The invention claimed is:

1. A device configured to detect the presence of abnormalities on an external surface of a reel, the device comprising:
 an image capturing module configured to capture images of the reel, the image capturing module comprising at least one camera;
 a displacer configured to displace the reel in a field of view of the at least one camera;
 an analyzer configured to analyze the images captured by the at least one camera and to detect the presence of abnormalities, wherein the abnormalities are configured to define failures on the external surface of the reel including misaligned core of the reel, reel core dimensions default, crushed reel core, reel width variation, reel diameter variation, irregular reel side, reel telescoping effect, waving of the reel, and color contamination of the reel;
 wherein the image capturing module comprises an upper capturer configured to capture images of an upper face of the reel, and a lower capturer configured to capture images of the lower face of the reel, the upper capturer fixed on a movable support arranged for being vertically movable with respect to the lower capturer between a first vertical position and a second vertical position where the upper capturer is closer to the reel than when the movable support is in the first position, the upper capturer comprising at least one first camera that includes at least one three dimension (3D) camera arranged to provide a three dimension (3D) image of the reel and the lower capturer comprising at least one second camera; and
 a computing arrangement configured to compute at least one parameter of the detected abnormality, including at least one dimension of the abnormality, wherein the computing arrangement is configured to determine if the reel should be rejected based upon the abnormality.

2. The device according to claim 1, wherein the image capturing module further comprises an illuminator configured to illuminate while the image capturing module captures the images of the reel.

3. The device according to claim 1, further comprising:
 at least one actuator configured to actuate movement of the movable support.

4. The device according to claim 1, wherein the at least one first camera comprises the at least one 3D camera and at least one 2D camera, and the at least one second camera comprises at least one 3D camera and at least one 2D camera.

5. The device according to claim 1, further comprising:
 at least one sensor module configured to activate and deactivate the image capturing module to control capture of the image depending on the position of the reel with respect to the at least one camera.

6. The device according to claim 1, wherein the displacer includes at least a conveyor belt configured to convey the guiding of the reel through the field of view of the at least one 3D camera.

7. The device according to claim 6, wherein the at least one conveyor belt includes a plurality of rollers, the rollers having a beveled surface arranged for contacting the reel.

8. The device according to claim 1, further comprising:
a cleaning system configured to clean a lens of the at least one camera.

9. The device according to claim 8, wherein the cleaning system includes a pneumatic system that includes at least one blow nozzle and at least one regulating valve configured to regulate the air flow to the at least one blow nozzle.

10. The device according to claim 1, wherein the at least one dimension includes at least one of a width, a diameter, a height and a volume of the abnormality.

11. The device according to claim 1, wherein the analyzer is arranged for stopping the displacer and is configured to issue an audible warning and/or sending a warning message to a user if one or more of the abnormalities are found.

12. A method for detecting one or more abnormalities on an external surface of a reel, the method comprising:
providing the device according to claim 1;
activating the displacer so as to place the reel between the upper capturer and the lower capturer;
actuating the movable support so as to place the reel in the field of view of the 3D camera;
capturing images of the reel; and
analyzing the captured images to detect the presence of the abnormalities.

13. The method according to claim 12, further comprising:
providing a theoretical value of at least one parameter of the reel, wherein the at least one parameter includes width in cross-section of a diameter of the reel; and
moving the movable support depending on the theoretical value of the reel to adjust the position of the reel with respect to the 3D camera.

14. The method according to claim 13, wherein the at least one parameter of the reel includes a width in cross-section of a diameter of the reel.

15. The method according to claim 12, wherein the image capturing module comprises at least one 3D camera and at least one 2D camera, and wherein the method further comprises:
computing the captured 3D and the 2D images to generate a processed image; and
analyzing the processed image to detect the presence of abnormalities.

16. The device according to claim 1, wherein the at least one first camera includes a camera positioned directly vertically above the reel and the at least one second camera includes a camera positioned directly vertically below the reel when the reel is in the field of view.

* * * * *